United States Patent [19]

Ballestrazzi et al.

[11] Patent Number: 5,285,621
[45] Date of Patent: Feb. 15, 1994

[54] APPARATUS FOR STRETCHING A CONTINUOUS PLASTICS FILM IN A PACKAGING MACHINE

[75] Inventors: Aris Ballestrazzi; Lamberto Tassi, both of Savignano sul Panaro, Italy

[73] Assignee: Sitma S.p.A., Modena, Italy

[21] Appl. No.: 958,781

[22] Filed: Oct. 9, 1992

[30] Foreign Application Priority Data

Oct. 14, 1991 [IT]  Italy ............ MI91 A 002707

[51] Int. Cl.⁵ .......... B65B 41/02; B65B 51/30
[52] U.S. Cl. .................... 53/556; 53/374.6; 53/389.5; 198/575
[58] Field of Search ........... 198/575, 576, 577, 579; 53/228, 374.6, 389.5, 441, 550, 553, 556, 586, 374.5, 375.4

[56] References Cited

U.S. PATENT DOCUMENTS

| | | | |
|---|---|---|---|
| 1,606,166 | 11/1926 | Green et al. | 198/577 X |
| 4,430,844 | 2/1984 | James | 53/550 X |
| 4,506,488 | 3/1985 | Matt et al. | |
| 4,709,537 | 12/1987 | Ballestrazzi et al. | 53/550 |
| 4,715,166 | 12/1987 | Kameda | |
| 4,872,302 | 10/1989 | van Eijsden et al. | 53/441 |

FOREIGN PATENT DOCUMENTS

| | | |
|---|---|---|
| 0018041 | 10/1980 | European Pat. Off. |
| 0083912 | 7/1983 | European Pat. Off. |
| 0111210 | 6/1984 | European Pat. Off. |
| 0209184 | 1/1987 | European Pat. Off. |
| 0304978 | 3/1989 | European Pat. Off. |
| 2331484 | 6/1977 | France |

*Primary Examiner*—John Sipos
*Assistant Examiner*—Linda Johnson
*Attorney, Agent, or Firm*—Oblon, Spivak, McClelland, Maier & Neustadt

[57] ABSTRACT

An apparatus for stretching a continuous plastic film in a packaging machine, in which products fed one after the other are wrapped and sealed within the continuous film, which includes a first conveyor belt, a transverse welding apparatus, and a second conveyor belt, in which the transverse welding apparatus has a horizontally traversing carriage which supports a pair of superposed welding bars and a pressing belt facing the second conveyor belt. The conveyor belts are driven by a speed variator via a pair of transmissions, the first of which drives an end roller of the first conveyor belt and the second drives an end roller of the second conveyor belt by way of a linkage which varies the speed of the two conveyor belts, there being also provided upstream of the transverse welding apparatus, both above the first conveyor belt and operationally linked to the vertical movement of the upper welding bar, elements for clamping the film onto the products wrapped in it.

4 Claims, 4 Drawing Sheets

APPARATUS FOR STRETCHING A CONTINUOUS PLASTICS FILM IN A PACKAGING MACHINE

BACKGROUND OF THE INVENTION

1. Field of the Invention

This invention relates to an apparatus for stretching a continuous plastics film in a packaging machine.

Discussion of the Background

In machines for packaging products fed one after another, using continuous plastics film of a heat-shrinkable type or not, it is known to weld the film, when wrapped about the product, in a direction transverse to the product and film feed direction, to form a package which is at least partly closed.

It should be noted that the package obtained is always larger than the product which it contains, resulting in a wastage of plastic material and a package in which the film does not perfectly and completely adhere to the contained product.

The film excess within the package derives from the fact that it is normally closed by a hot bar welder which compresses the film between itself and a counter-welder within the separation space between one product and the next. Any excess film visible in the finished package is removed by known heat-shrinkage which causes the film to adhere to the product.

This means firstly that the products to be packaged have to be fed spaced apart, and secondly that further equipment is required for the subsequent heat-shrinkage.

SUMMARY OF THE INVENTION

An object of the present invention is to solve the aforementioned problems in such a manner as to obtain packages in which the film which wraps the products adheres perfectly to them when the transverse weld has been made.

A further object strictly related to the latter object is to dispense with the need for further equipment representing both additional investment and operating cost.

These objects are attained according to the present invention by an apparatus for stretching a continuous plastics film in a packaging machine in which products fed one after the other are wrapped and sealed within said continuous film, comprising a first conveyor belt, a transverse welding apparatus, and a second conveyor belt all driven by a central drive unit, said transverse welding apparatus comprising a carriage which transverses horizontally relative to a frame of the packaging machine and supports a pair of superposed welding bars, one upper and one lower, movable vertically between a position in which they are separated from the continuous film containing the products and a position in which they engage said film for its welding, there being further provided a pressing belt upwardly facing said second conveyor belt, characterised in that said first and second conveyor belts are driven by a speed variator via a pair of transmissions, a first transmission directly driving an end roller of said first conveyor belt and the second transmission driving an end roller of said second conveyor belt by way of a linkage providing speed variation relative to the speed of said first conveyor belt, there being also provided upstream of said transverse welding apparatus, both above said first conveyor belt and operationally linked to the vertical movement of said upper welding bar, means for clamping said film onto said products wrapped in it.

An apparatus according to the invention therefore advantageously enables finished packages to be obtained in which the plastic film is perfectly wrapped about and adheres to the products. In this manner the packages are suitable for immediate subsequent handling or further treatment by other machines, or for immediate use.

BRIEF DESCRIPTION OF THE DRAWINGS

The structural and operational characteristics and advantages of an apparatus according to the present invention will be more apparent from the description given hereinafter by way of nonlimiting example with reference to the accompanying schematic diagrams, in which:

With reference to FIG. 1, a stretching apparatus for a continuous plastics film according to the present invention is incorporated by way of example into a partly illustrated packaging machine indicated overall by reference number 11. The packaging machine 11 is of a known type and enables products 12, arranged in a stacked manner in an entry portion of the machine, to be fed one at a time by a pusher conveyor (not shown). A first conveyor belt 13, shown only partly, receives the products 12 and feeds them towards a transverse welding apparatus, indicated overall by 14. The transverse welding apparatus 14 comprises a carraige 15 traversable horizontally relative to the frame of the machine 11 and carrying upper and lower welding bars 16, movable 17 welding bars movable vertically within the carriage 15. Downstream of the welding apparatus 14 there is provided a second conveyor belt 18 for removing the packaged products 12.

Figure 1:
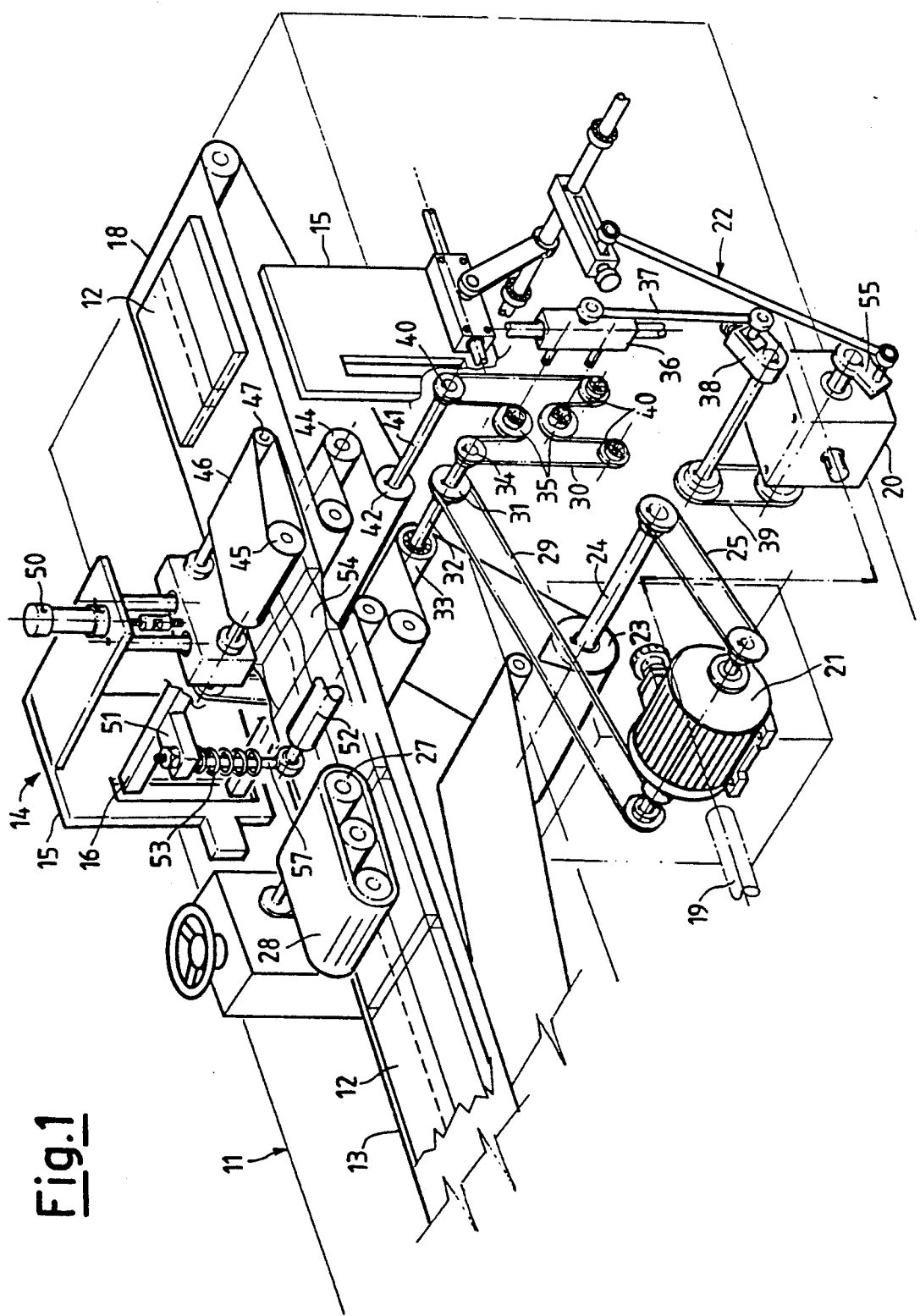
FIG. 1 is a perspective view of an end portion of a packaging machine provided with a apparatus according to the present invention.

The frame of the machine 11 also supports in a known manner, not shown, at least one roll of plastic film material for wrapping the products 12. A central drive, shown partially as a portion of a transmission shaft 19, drives via a right-angle drive 20 a speed variator 21 connected to the belts of the two conveyors 13 and 18 and to a control unit 22 for the carriage 15 and for the relative welding bars 16 and 17.

Specifically, the first conveyor belt 13 is driven, via its roller 23, fixed onto the shaft 24, by a transmission 25 extending from one side of the speed variator 21. A further transmission portion 26 (FIG. 2), also deriving its motion from the shaft 24, is arranged between said roller 23 and a first roller 27 of a pressing belt 28 which extends as a flattened endless loop and is situated upstream of the transverse welding apparatus 14. The pressing belt 28 moves synchronously with the underlying conveyor belt 13 and lies a certain distance above and facing it, in order to embrace the passing feed products 12. The other side of the speed variator 21 drives a second transmission consisting of two portions 29 and 30 and driving the second conveyor belt 18. The first portion 29 of the second transmission rotates a pulley 31 fixed onto a shaft 32 supported freely and rotatably within a roller 33 about which the first conveyor belt 13 passes. A further pulley 34, also fixed onto the shaft 32, rotates for rotating the second transmission portion 30, which passes about a unit definable as a linkage for varying the speed of the second conveyor belt 18 relative to the first 13. This unit consists of a pair of idle pinions 35 supported on a slide 36 moved with reciprocating vertical movement. The slide 36 is driven by a transmission linkage comprising a lever 37 positioned between the slide 36 and a position-adjustable eccentric element 38. The eccentric element 38 is rotated by a further transmission 39 extending from the right-angle drive 20. Besides passing about the idle pinions 35 and pulley 34, the transmission portion 30 passes about further pinions 40 to define a path consisting of two adjacent loop portions joined at a central zone formed by the slide 36. In this manner, as the slide is vertically mobile the joining point between the two loop portions is also vertically mobile. By means of a shaft 41 on which it is fixed, one of said pinions 40 rotates a further roller 42 which drives the second conveyor belt 18. A further transmission portion 43 deriving its motion from a further roller 44 about which the second conveyor belt 18 passes rotates a roller 45 of a second pressing belt 46 facing the upper part of the second conveyor belt 18. The second pressing belt 46, also in the form of a flat endless loop, is supported via its end rollers 45 and 47 on a block 48 fixed to the end of the rod 49 of a cylinder 50. The cylinder 50 is secured to the carriage 15 and by the movement of its rod 49 causes the second pressing belt 46 to move vertically towards or away from the second conveyor belt 18.

It should be noted that means for clamping the film onto the products wrapped in it are provided so as to be rigid with or fixed to the upper welding bar 16. These clamping means comprise a pair of brackets 51 supporting a roller 52 via vertical lateral rods 57, with vertical damper elements 53 therebetween. The roller 52 acts as a stop roller for the pre-stretched film 54, being rotatable only in the direction of advancement of the products 12.

The movement of the carriage 15 carrying the rollers about which parts of the conveyor belts 13 and 18 pass and slide and the welding bars 16 and 17 is derived, as stated, from a control unit 22 which derives its movement laterally from the right-angle drive 20 with element 55. The control unit 22 is not described specifically herein as it is an already known unit.

On the carriage, in addition to the deviation roller 44 there are further provided two rollers 56 about which there passes facing portions of both the conveyor belts 13 and 18 and which are separated from each other to define an aperture for the passage of the welding bars 16 and 17. The rollers 42, 33 with the relative pinions 34 and 40 about which the second transmission portion 30 passes are instead rotatably supported on the frame of the machine 11. The operation of a stretching apparatus in a packaging machine according to the present invention is as follows. As stated, the products 12 are fed one after another onto the first conveyor belt 13 by way of an interposed continuous plastic film which is arranged to wrap them completely by known means, not shown. In this respect, usually the longitudinal edges of the film are superposed onto each other to define almost a continuous tube of plastics material containing the products spaced apart. The conveyor belt 13 then feeds the products wrapped in this manner to the transverse welding apparatus 14, which transversely welds the leading and trailing end of each product to form the package.

Figure 2:
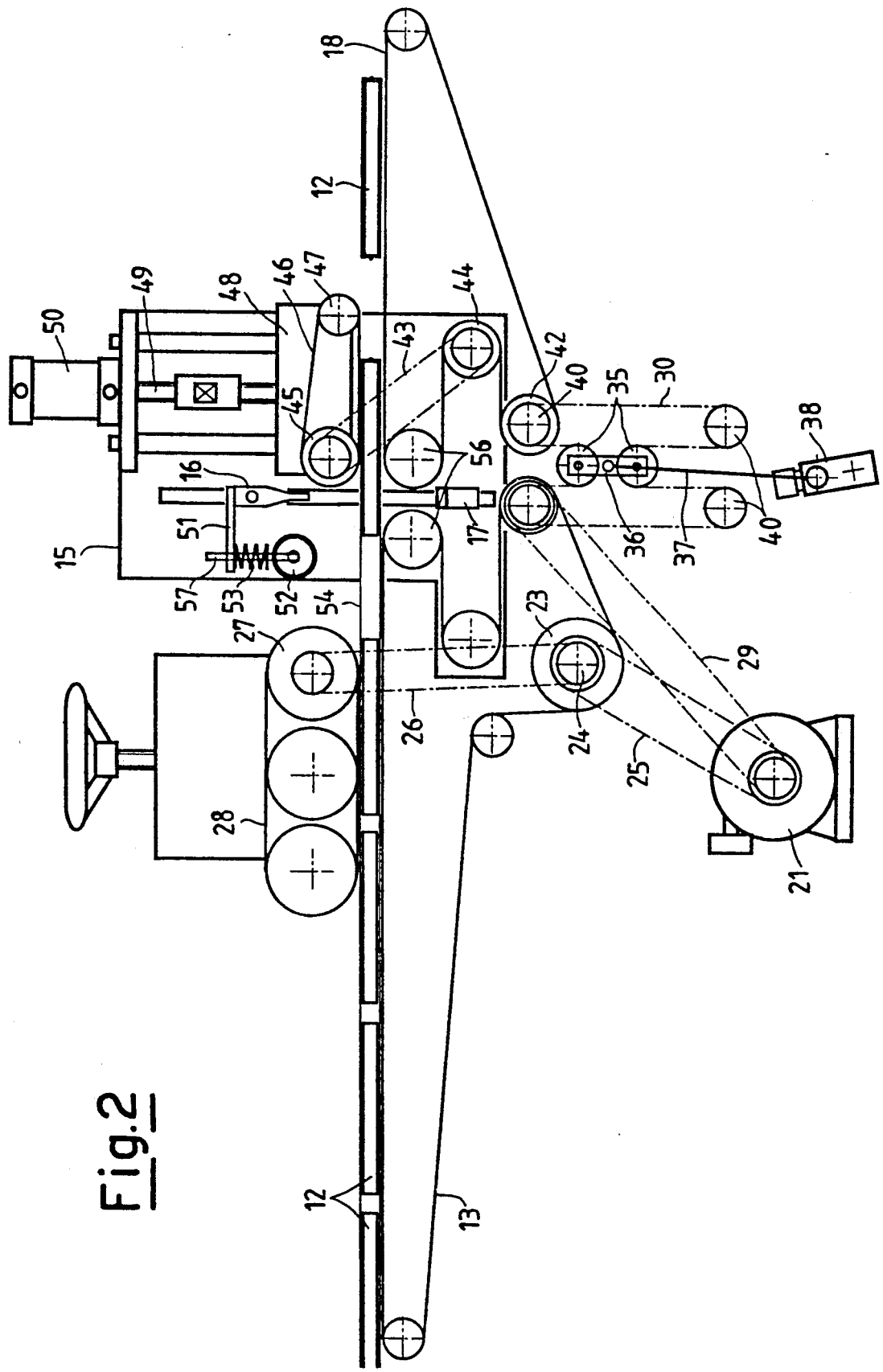
FIGS. 2, 3 and 4 are schematic elevational views of that part of the packaging machine comprising the apparatus of the invention in different operating positions.

In the packaging machine provided with an apparatus according to the present invention, the products wrapped in this manner upstream of the transverse welding apparatus pass between the first conveyor belt 13 and the pressing belt 28, which maintains the film clamped onto the product. The products are then fed between the welding bars 16 and 17 and inserted between the second conveyor belt 18 and the second pressing belt 46. During this stage, as shown in FIG. 2, the speed variation linkage about which the second transmission portion 30 driving the second conveyor belt 18 passes acts to effect a pre-stretching of the film in the zone between the two pressing belts 28 and 46. In this respect, the slide 36 operated by the lever 37 moves upwards so that the speed of the second conveyor belt 18 is higher than that of the first conveyor belt 13. As both the pressing rollers 28 and 46 are connected by rigid transmissions 26 and 43 to the relative conveyor belts 13 and 18, these also move at different speeds, so that during their movement they clamp between them the film portions wrapped about the products to consequently prestretch the film within said zone. During this stage the carriage 15 withdraws from the pressing belt 28.

Figure 3:
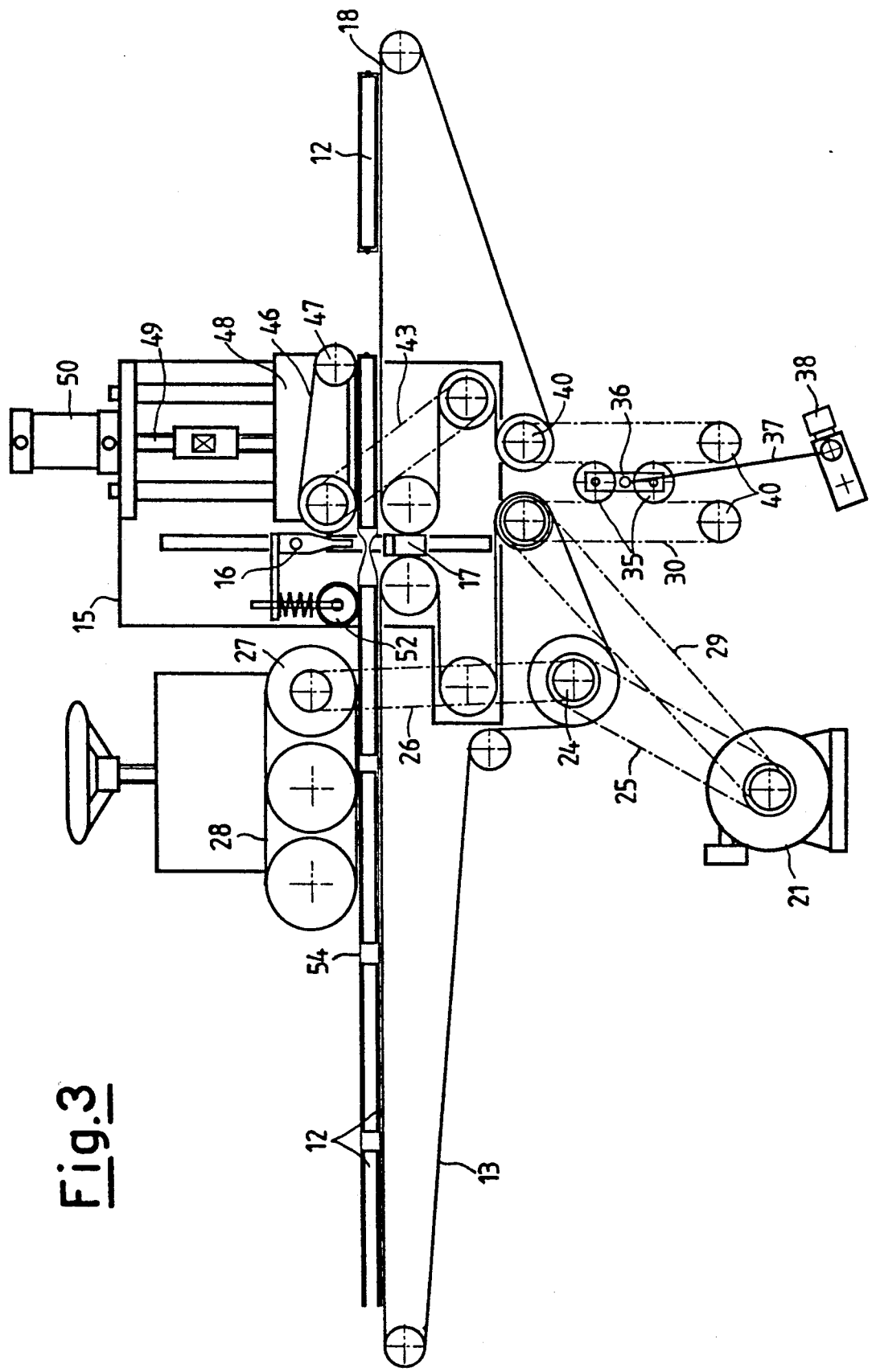

Then the eccentric element 38, continuing to rotate (FIG. 3), reverses the vertical movement of the slide 36, which descends to reduce the speed of rotation of the second conveyor belt 18 with respect to the first conveyor belt 13. During this stage the control unit 22 causes the welding bars 16 and 17 to approach the continuous film 54 in the zone between the two pressing belts 28 and 46. In addition the roller 52, supported by the upper welding bar 16, moves downwards to rest on the next product 12 wrapped in film, so as to secure the film to the product on the upstream side of the roller 52 and prevent it from stretching. During this stage the film tends to slacken only within the welding zone between the pressing rollers 28 and 46, and the carriage 15 approaches the pressing belt 28.

Figure 4:
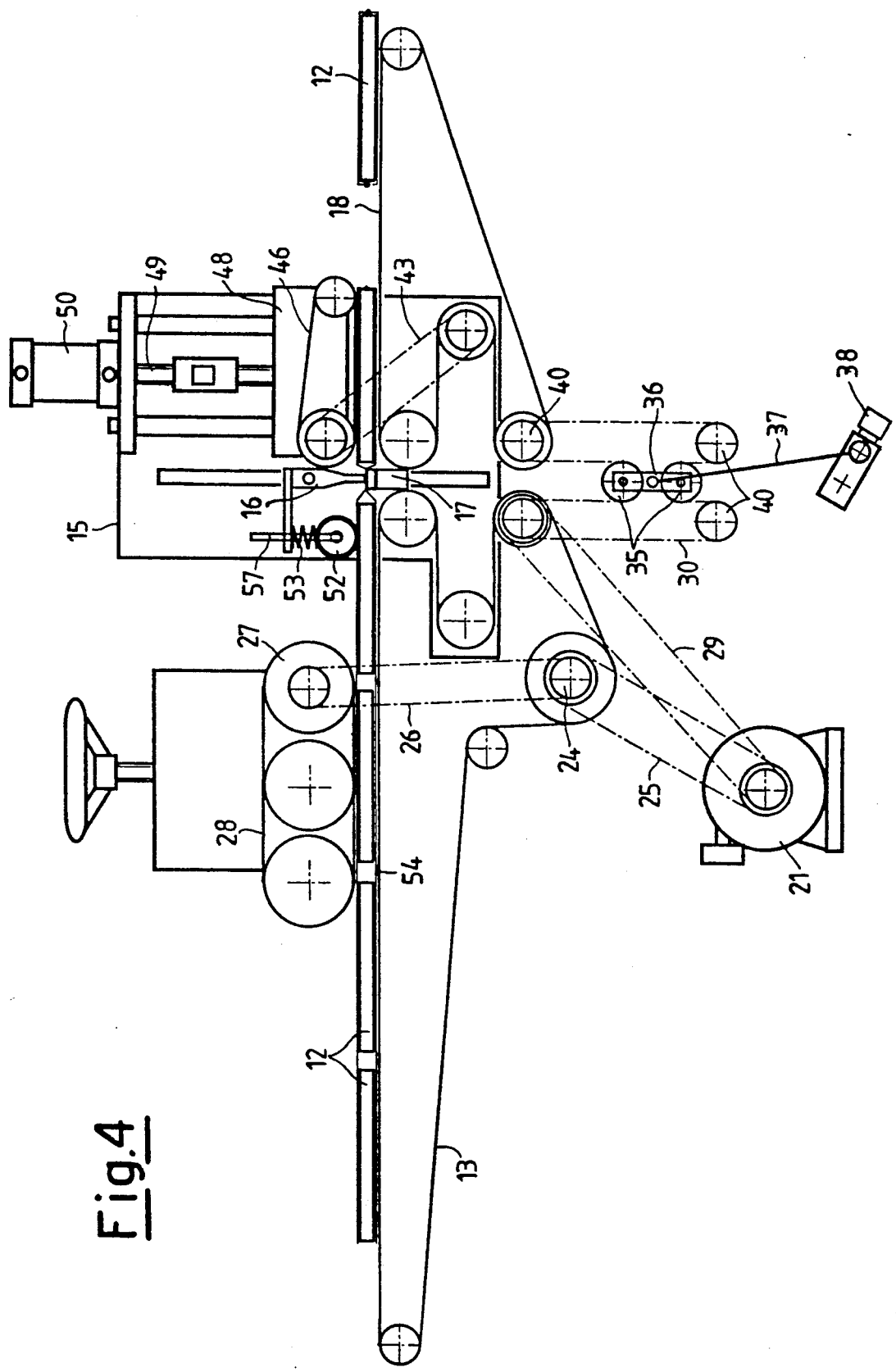

As can be seen in FIG. 4, the eccentric element 38 in continuing to rotate causes the slide 36 to descend further, and further reduce the speed of advancement of the conveyor belt 18, so that the film zone between the two pressing belts is further reduced. When welding has taken place, once the welding bars disengage from the film, the leading and trailing welded film portions on finally being released arrange themselves so that they completely and correctly wrap on one side the trailing end of the completed package, and on the other side the leading end of the package still to be completed.

When this cycle is complete the entire operation of pre-stretching and subsequent welding of the plastics film is repeated, to complete the commenced package by welding its trailing end and forming a new leading end weld on the next product, and so on continuously.

With an apparatus of the present invention it is no longer necessary to feed the products spaced apart from each other in order to form the leading and trailing end welds on the package. In this respect, said spacing is achieved by simply using the elasticity of the plastics material, with a consequent material saving.

A further advantage is that in the packages wrapped in the plastics film, the film perfectly adheres to the product, with the result that these are suitable for easy and direct handling by further machines.

A further advantage is that the usual subsequent heat-shrinkage treatment required to make the film of heat-shrinkable material adhere to the product is no longer necessary. This dispenses with further machinery such as heat-shrinking ovens, resulting in a saving of investment, production and maintenance costs.

The provision of a vertically movable block 48 carrying the second pressing belt means that this latter can be disengaged from the product-containing film for maintenance of the apparatus, or during operation if the packaging production cycle is operating incorrectly.

I claim:

1. An apparatus for stretching a continuous plastic film in a packaging machine, in which products fed one after the other are wrapped and sealed within said continuous film, which comprises:

a frame, a first conveyor belt having an end roller for conveying the continuous film and a series of products therebetween, a transverse welding apparatus, and a second conveyor belt having an end roller, a central drive unit for driving said first and second conveyor belts and said welding apparatus, said transverse welding apparatus comprising a carriage which is traversable horizontally relative to said frame of the packaging machine and has supported thereon a pair of superposed, upper and lower welding bars movable vertically between a position in which they are separated from the continuous film containing the products and a position in which they engage said film for welding, a pressing belt facing said second conveyor belt, a speed variator and a first and second transmission for driving said first and second conveyor belts, a linkage assembly such that said first transmission directly drives said end roller of said first conveyor belt and the second transmission drives said end roller of said second conveyor belt by said linkage assembly wherein said linkage assembly provides increased speed of the second conveyor belt relative to the speed of said first conveyor belt to stretch said continuous film, a clamping mechanism provided upstream of said transverse welding apparatus, both above said first conveyor belt and operationally linked to the vertical movement of said upper welding bar, for clamping said film onto said products wrapped in said film, and means for rigidly connecting said clamping mechanism to said upper welding bar wherein said clamping mechanism comprises a roller, a pair of brackets supporting said roller via vertical lateral rods with damper elements interposed therebetween, said roller being rotatable only in a direction of advancement of said product.

2. An apparatus as claimed in claim 1, wherein said speed variation linkage comprises a slide having a pair of idle pinions and movable vertically with reciprocating movement, a lever for operating said slide, and an eccentric element, connected to a central drive of said packaging machine for controlling said lever.

3. An apparatus as claimed in claim 1, which comprises a block connected to an end portion of the rod of a cylinder connected to said carriage wherein said pressing belt facing said second conveyor belt is supported on said block.

4. An apparatus as claimed in claim 2, wherein said second transmission comprises a first and a second portion arranged in succession, said second portion extending through a path consisting of two adjacent loop portions joined together at a central zone defined by said slide, wherein the connection point between said two loop portions is vertically movable.

* * * * *